Dec. 3, 1957 V. G. ANDERSON 2,815,310
PROCESS OF ASSEMBLING IN THE ART OF
CHANGEABLE PICTURE DISPLAY DEVICES
Filed March 1, 1952 3 Sheets-Sheet 1
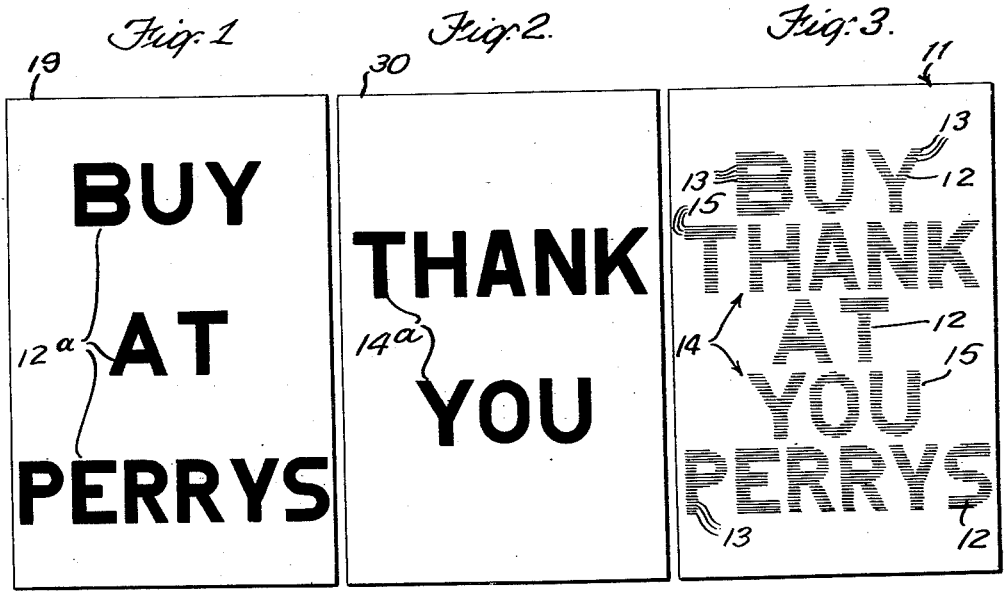
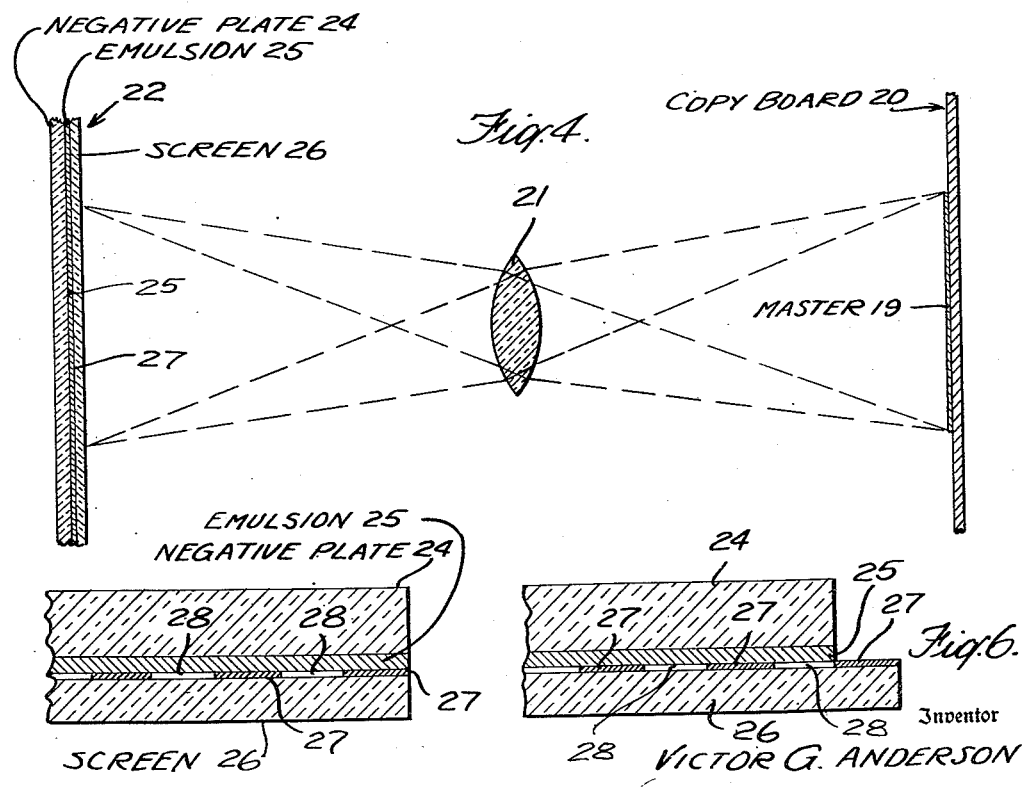
Inventor
VICTOR G. ANDERSON
By Victor N. Borst
Attorney

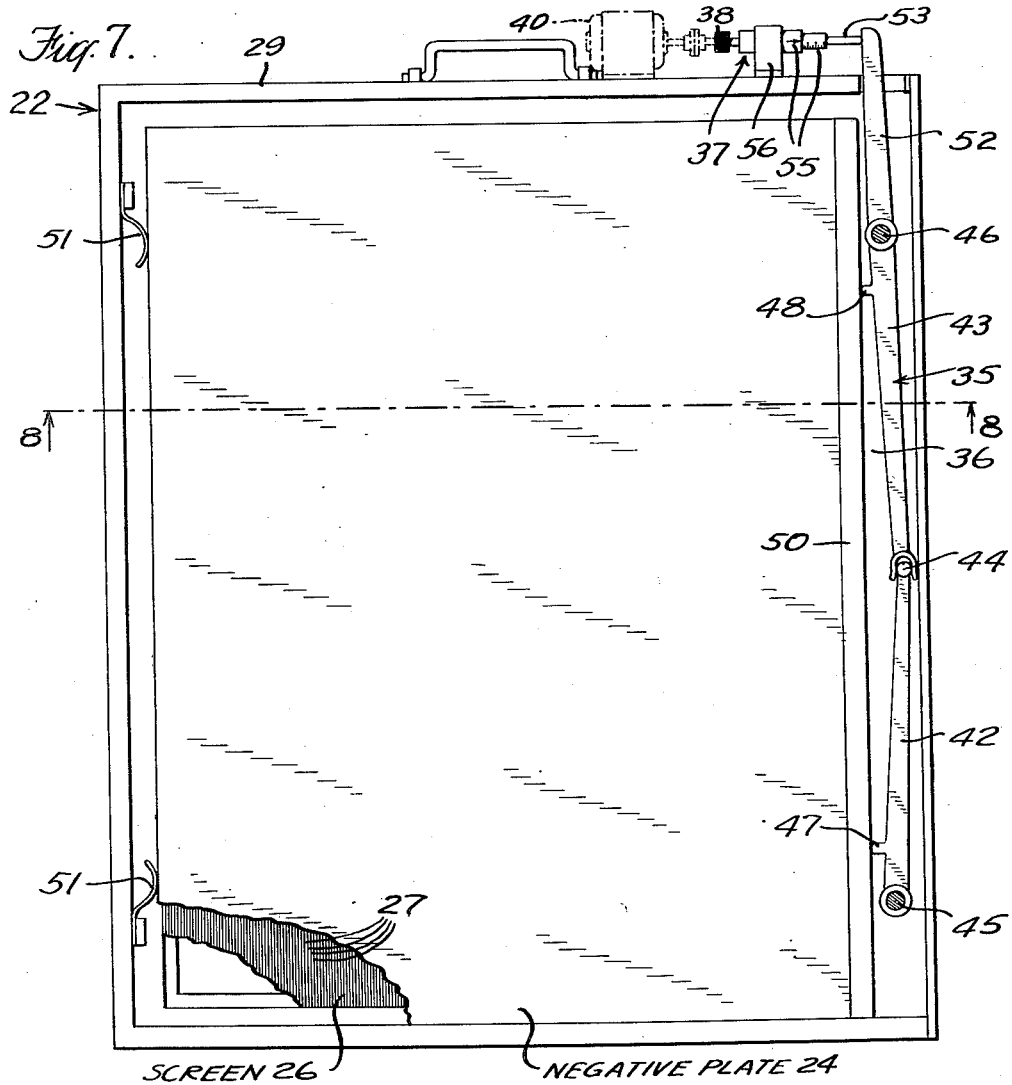
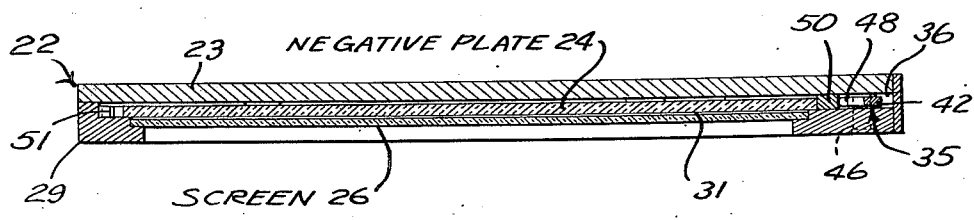

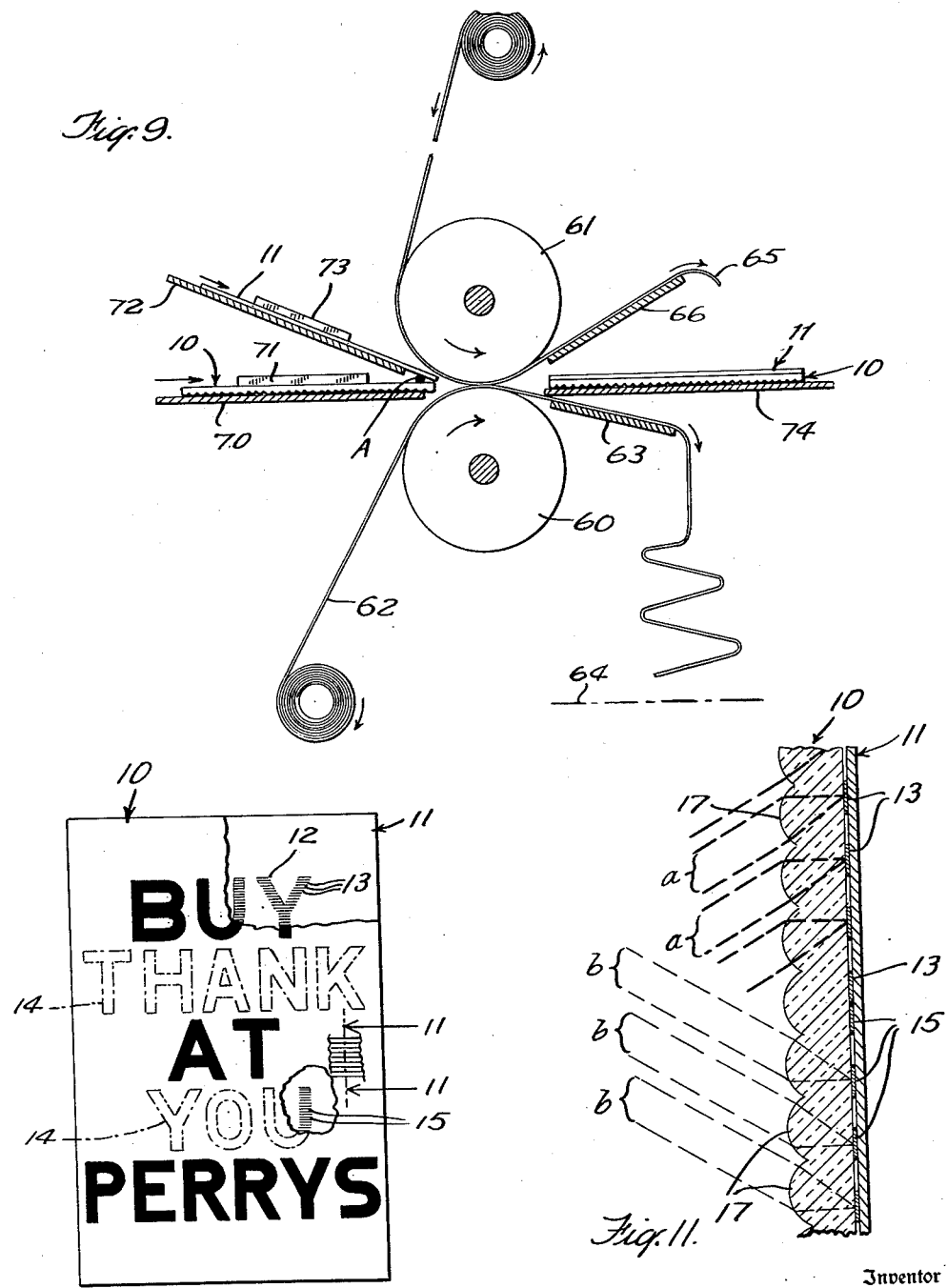

United States Patent Office 2,815,310
Patented Dec. 3, 1957

2,815,310

PROCESS OF ASSEMBLING IN THE ART OF CHANGEABLE PICTURE DISPLAY DEVICES

Victor G. Anderson, New Rochelle, N. Y., assignor to Pictorial Productions, Inc., New Rochelle, N. Y., a corporation of New York Application March 1, 1952, Serial No. 274,457

1 Claim. (Cl. 154—122)

The present invention relates to the art of multiple or changeable picture display devices.

A changeable picture display device contemplated in accordance with the present invention comprises a lenticular viewing screen having on its front face a series of very fine contiguous parallel convolutions constituting segments of optical cylinders forming lens elements, and a print or picture sheet disposed at the back of said screen in face to face contact therewith as to be exposed or displayed therethrough and containing at least two alternate series of parallel complemental image lines parallel to the lens element of the screen, each series constituting a linear dissection of a master picture, object or subject and compositely defining a lineiform design or picture. The two series of image lines should be so optically related with respect to the lens elements of the viewing screen as to be separately and successively visible as coherent pictures upon positional change of said screen with respect to the line of vision.

Where the lineiform pictures on the print sheet represent different poses of the same object or subject, then when the pictures are viewed successively through the lenticular screen, there is produced an illusion of motion or animation as the position of said screen is changed relative to the line of vision.

In certain cases, the print sheet may bear a graphic reproduction of two or more different objects or subjects successively united or connected in a figurative sense by some common relationship or by subordination to one purpose or idea, so as to coherently follow each other in the mind of the observer.

Also, the lineiform pictures on the print sheet may represent images of a master object or subject from separate points of view. The different images of these lineated pictures presented to the eyes of the observer when viewed through a lenticular screen are fused into a single sensory image imparting the impression of depth, as in the case of so-called stereograms. As the observer moves relative to the lenticular viewing screen, the lineiform pictures come successively into view, and this creates the impression of continuous changes in the phases of motion of the different component elements of the viewed images according to the apparent ranges of said elements, thereby enhancing the visual sensation of depth.

In the specification and claims, by "changeable picture display device" is intended unless otherwise noted, not only a device for the display of two-dimensional pictures, in which two or more different pictures appear successively into view, but also a device in which two or more pictures of the same subject but taken from different points of view are blended by sensory perception into a single three-dimensional picture.

The print sheet containing a plurality of lineiform two-dimensional pictures, each of uniform tonal characteristics, for use in connection with a changeable picture device may be photographically made accurately and with sharp well-defined details, for example, as follows:

A sensitized negative plate is exposed to an image of uniform tonal qualities through an image lineating screen in the form of a single lines screen or a lenticular screen corresponding in rulings to the lenticular viewing screen in the ultimate display device, and then exposed to another related image of uniform tonal qualities through the same screen but displaced in a direction at right angles to its lineations relative to said negative plate, to expose successive linear sections of the negative plate to the successive images. Where the final print is intended to contain more than the two successive viewable pictures, the number of exposures on the negative plate is correspondingly increased. The negative plate when developed will have fixed thereon these images in lineated monotonal form, the linear components of the images being successively arranged. The sensitized negative plate after exposure as described, may be developed and employed directly to make a metal printing line plate by photographic-chemical processes well-known in the photoengraving art.

In the process of exposing a sensitized negative plate to successive images to produce monotone pictures in the print in the manner described, or to form a half-tone print for two-dimensional reproduction, a very fine image lineating screen is employed in which the distance between successive lineations is very small. Therefore, the negative plate must be accurately moved relative to the lineating screen through very small measured increments at right angles to the lineations of the screen for successive exposures to the different images, and must be translated without rotation to assure that the image lineations projected upon the negative plate are parallel. In the case where prints are to be made for three-dimensional reproductions, a fine image lineating lenticular screen is employed, in which case it may be necessary to move the negative plate relative to the screen at right angles to the longitudinal direction of the lens elements on said screen for a total distance equal to the width of a lens element, while the camera containing said plate is sweeping continuously across the field of view to obtain a progression of exposures from different points of view. For this or similar set-ups, it is necessary that the negative plate be moved relative to the screen at slow uniform speed in synchronism with the sweeping movement of the camera or step by step through very small accurately measured increments, in the case where the camera is moved step by step for intermittent exposures and that these movements of the negative plate be effected free of rotation to assure parallelism in he lines of the successive images projected upon the negative plate.

In the final changeable picture display device, it is important that the lenticulations of the viewing screen correspond to the lineations of the print and that the two be disposed in exact optical registry to maintain the desired viewing distance and to cause the pictures on the print to be cleanly flipped suddenly in and out of view with minimum of blurring and overlapping transition and with comparatively small angular movements of the device with respect to the line of vision. Many factors may adversely affect the obtainment of these desirable conditions. For example, the lenticular viewing screen and the print may not be disposed in proper optical registry or temperature conditions may dimensionally affect the screen and the print to different extents, so that there is no longer the proper correspondence between the lenticulations of the screen and the lineations of the print, even if originally such correspondence existed. Due to the very small distances between successive lens elements of the viewing screen and between successive picture lineations in the print, the display device is extremely sensitive to the changes and inaccuracies indicated above.

If the print and lenticular viewing screen are held face to face in the display device without adhesive attachment therebetween, there is no effective control against relative dimensional changes due to temperature conditions and against possible relative displacement of these sheet members after a period of use, due to wear. If the viewing screen and the print are adhesively secured together, there is (1) the problem of applying the adhesive evenly and in extremely thin layers between these two sheet members (2) the lack of accurate control during assembly, which may cause the two sheet members to be combined in non-registering optical relationship and (3) the difficulty of controlling relative changes in the dimensions of these sheet members due to temperature conditions before assembly.

One object of the invention is to provide a new and improved process by which the lenticular viewing screen and print are assembled and adhesively secured together while being maintained under accurate control, whereby these sheet members are permanently secured in proper optically registered position.

In carrying out this object of the invention, the lenticular viewing screen and the print are convergently fed towards the field of action of a pair of pressure rolls, where they are brought together face to face. Applied to one of these faces is a linear bead of transparent adhesive extending across said face in a direction transverse to the general direction of feed of the sheet member carrying said bead. This bead of adhesive is spread evenly as an extremely thin layer over the confronting faces of the sheet members by the pressure rolls, as they are fed through the bite of said rolls. The two sheet members are brought together as they are fed into the field of action of the pressure rolls and emerge therefrom in assembled relationship and in approximate optical registry. As the assembled pack emerges from the field of action of the pressure rolls, the operator picks up the pack and guided by visual observations makes final adjustments in the relative position of the two sheet members. The adhesive has delayed setting characteristics, which permits the two sheet members to be shifted relatively edgewise to attain this final adjustment in their relative positions.

If before assembly, it is found that the sheet members have dimensionally changed relatively due to changes in temperature conditions, one of said sheet members may be brought back to dimensional lineal correspondence with the other sheet member by subjecting it to the proper temperature for the purpose.

Various other objects, features and advantages of the invention are apparent from the following particular description and from the inspection of the accompanying drawings, in which—

Figure 1 is a face view of a master or "copy" from which one of the lineiform pictures of the final print to be used in the changeable picture device may be made;

Figure 2 is a face view of another master or "copy" from which another lineiform picture of the final print may be made;

Figure 3 is a print adapted for use in connection with a lenticular viewing screen in a changeable picture display device and shown containing two lineiform pictures corresponding to those on the masters of Figures 1 and 2, for successive appearance in said device;

Figure 4 is a diagram showing the process by which a photographic negative plate is exposed to the images of a multiplicity of masters or "copies" in successive steps, in the operation of making the final print of Figure 3 for the changeable picture display device;

Figure 5 is a section on an exaggerated scale through the combined negative plate and lineating screen shown in one relative position for exposure to the master of Figure 1;

Figure 6 is a section on an exaggerated scale through the combined negative plate and lineating screen similar to that of Figure 5, but shown in relatively shifted position for exposure to the other master of Figure 2;

Figure 7 is a diagrammatic face view of the loaded plate holder unit of Figure 4 shown with the backing plate removed and illustrating the mechanism for moving the negative plate relative to the lineating screen through small increments;

Figure 8 is a section of loaded plate holder unit taken approximately along the lines 8—8 of Figure 7;

Figure 9 is a diagrammatic side view of an apparatus for carrying out the operation of assembling the print and the viewing screen in accordance with the process of the present invention, to form a pack constituting the essence of the changable picture display device described;

Figure 10 is a face view of the assembled display pack, one of the lineiform pictures on view being indicated in full lines, the other picture which is blanked out of view but which will come into view when the pack is tilted with respect to the line of vision being shown in dot and dash lines; and Figure 11 is a section of the assembled display pack taken approximately on lines 11—11 of Figure 10 but on an enlarged scale.

Referring to Figures 10 and 11 of the drawings, there is shown a changeable picture display device comprising a lenticular viewing screen 10 and a picture sheet 11 (Figurse 3, 10 and 11) disposed behind said screen as to be exposable therethrough and having on the front face thereof a lineiform picture 12 constituting a printed reproduction of a phtograph, painting, printing or other object or subject resolved graphically into a series of picture segments in the form of parallel fine complemental lineations 13, and a second picture 14 constituting a printed reproduction of a photograph, painting or other object or subject resolved graphically into a second series of picture segments in the form of parallel complemental lineations 15 alternating with the lineations 13 where the two pictures overlap (no overlap is shown). The two pictures 12 and 14 are related, so that when viewed successively and alternately, they convey coherent ideas. In the specific form illustrated, the picture 12 is shown constituting a printed advertising message, namely "Buy at Perrys" and the picture 14 is shown constituting another related printed message, namely "Thank You."

The lenticular screen 10 is made of transparent material such as cellulose acetate and has formed on the front face thereof a series of contiguous segments of cylinders defining lens elements 17 extending parallel to the image lineations 13 and 15 on the print sheet 11. The screen 10 and the print sheet 11 have rulings multiply related according to the number of pictures on said print sheet. For example, if the viewing screen 10 has 64 lens elements 17 per inch, and if the print sheet has only two pictures thereon, as in the specific embodiment shown, this sheet would have 128 image lines thereon per inch. The screen 10 and the print sheet 11 are in optical registry or coincidence to cause component lines 13 of the picture 12, when the display device is in one position with respect to the line of vision, to be optically composed and to come into view as a coherent solid image, while the component lines 15 of the other picture 14 are blanked out of view, and to cause the component lines 15 of said other picture 14, when the position of the display device is changed with respect to the line of vision, to be optically composed and to come into view as another coherent image, while the component lines 13 of the picture 12 are blanked out. The image lines by which the different images 12 and 14 are brought separately and independently into focus through the lenticular viewing screen 10 by reason of a change in the angle of observation are indicated by dot and dash lines $a$ and $b$ in Figure 11.

The manner in which these effects are produced and the optics of the phenomena described are well-known and need not be further described.

Figures 1–8 show the manner in which the picture sheet 11 may be made. To make this picture sheet, for example, the subject or object to be graphically reproduced as a lineated picture in the picture sheet 11 may be set up in fixed position and a negative impression may be photographically taken of said subject or object through a lineating screen. Figures 1, 2, and 4–8 show how this step is carried out in connection with a specific example. For instance, where the object to be graphically reproduced is a master photograph, painting or a printing 19 (Fig. 1) bearing some monotonal picture such as the advertising message 12a, this sheet referred to as a "copy" in the parlance of photography is set up in fixed position on a copyboard 20 and the image thereof projected into a photographic camera having a lens 21 and a loaded plate holder unit 22. This unit 22 comprises a backing plate 23 (Fig. 8), a sensitized negative plate 24 disposed against said backing plate and bearing a layer 25 (Figs. 4 and 5) of the normal emulsion used in conventional photography, a lineating screen 26 of the single lines type bearing a single series of spaced parallel opaque lines 27 (Figs. 4, 5 and 7) and intervening transparent linear spaces 28 and placed against the emulsion layer of the negative plate, and a plate holder 29 (Figs. 7 and 8) retaining these members in face to face contact. The ruling of the single lines screen 26 corresponds to that of the viewing screen 10 (Figs. 10 and 11), the two rulings being for example 64 opaque lines per inch in the case of the lineating screen 26 and 64 lens elements per inch in the case of the viewing screen 10. The opaque screen lines 27 in the specific form shown are of equal width and are equally spaced by the transparent linear spaces 28 a distance equal to the width of said lines 27, and these screen lines are as close as possible to the emulsion layer 25 on the negative plate 24 in photographic set-up, to assure exposure of said plate along strip areas corresponding exactly to the areas of the transparent linear spaces 28 in the lineating screen 26. The spreading of the developable parts of the negative plate 24 in accordance with the intensity of the light rays projected thereon, as in halftone processes of making negatives is thereby avoided.

While the copy or master 19 (Fig. 1) is on the copyboard 20 for exposure, the negative plate 24 and the lineating screen 26 will be in the relative position shown in Fig. 5 and the picture 12a on said copy will be projected through the transparent spaces 28 of said screen and onto the sensitized face of said negative plate. The black lines 27 of the screen 26 will extend in a direction in relation to the picture 12a on the copy 19 to correspond to the direction of the lens elements 17 of the viewing screen 10 in relation to the picture sheet 11 in the final display device shown in Figs. 10 and 11. In the specific form shown, the single lines screen 26 is disposed with its lines 27 extending vertically, so that the copy 19 will be placed on the copyboard 20 on its side at 90° to the position shown in Fig. 1.

After the negative plate 24 has been exposed through the lineating screen 26 to the image 12a of the copy 19, another copy 30 (Fig. 2) related to said copy 19 and bearing for example the message 14a of monotonal characteristics, is placed on the copyboard 20 in the exact position of the first copy 19. The negative plate 24 is then moved relative to the lineating screen 26 in the direction at right angles to its lines 27, a distance equal to the width of the intervening transparent linear spaces 28, as shown in Fig. 6, so that the linear areas on the negative plate which have been previously exposed to the image 12a of the first copy 19 are covered up by the opaque lines 27 of said screen in the new position, while the linear areas of the negative plate previously covered by said screen lines are now exposed to the image 14a of the second copy 30. The lineating screen 26 and the negative plate 24 are maintained in face to face contact without any such excessive pressure therebetween which might adversely affect the emulsion surface of the plate by this relative movement therebetween. If desired, in order to assure against hurtful effect on the emulsion surface, a very thin transparent film fixed with respect to the negative plate 24 may be interposed between said plate and the lineating screen 26 or the plate and screen may be separated by a very thin air space 31 resulting from the shouldering of said plate and said screen in space relationship by the frame of the plate holder 29, as shown in Fig. 8.

The movement of the negative plate 24 relative to the lineating screen 26 in the direction indicated may be effected, as for example, by a micrometric device shown in Figs. 7 and 8. This device comprises a linkage 35 in the nature of a toggle located in a recess 36 in one side piece of the frame of the plate holder 29 and operated through a micrometer 37, either manually through a turning knob 38 or by a motor 40 through a speed reduction unit, as shown in dot and dash lines in Fig. 7. The toggle 35 comprises two lever arms 42 and 43 knee-jointed together end to end by a slotted connection or by a stirrup and ball connection at 44 and pivotally mounted at 45 and 46 respectively to the frame of the plate holder 29. Tappets 47 and 48 rigid with the arms 42 and 43 respectively bear against a platen bar 50, which in turn bears against one side of the negative plate 24, while the opposite side of said negative plate presses against leaf springs 51 secured to the frame of the plate holder 29. The arm 43 has an end extension 52 beyond its pivot mount at 46 connected to the spindle 53 of the micrometer 37.

The micrometer 37 is of the type similar to that employed in connection with calipers and comprises the spindle 53 movable lengthwise through manual operation of the rotatable thumb-piece or knob 38 and carrying a vernier scale 55. This micrometer 37 is secured to the frame of the plate holder 29 by a bracket 56, and where it is desired to operate the spindle 53 from a motor instead of manually, the motor 40 for the purpose is connected to the shaft of the knob 38 through a suitable speed reduction unit, as shown in dot and dash lines in Fig. 7.

The lengths of the toggle arms 42 and 43 between the knee-joint at 44 and the pivotal mounts at 45 and 46 are equal and the tappets 47 and 48 are located at equal distances from said knee-joint, so that the two tappets move together at the same rate and in parallel directions upon manipulation or upon the motor-drive of the micrometer 37. The distance between the pivot mount at 46 and the point of connection between the toggle arm extension 52 and the micrometer spindle 53, is greater than the distance between this pivot mount and the tappet 48, so that the extent of movement of the tappets 47 and 48 is reduced compared to the endwise movement of said spindle. This reduction in the tappet movement compared to the movement of the micrometer spindle 53, renders the mechanism described highly sensitive and accurate. The platen bar 50 is thereby translated by means of the mechanism described accurately through minute selected increments in a direction at right angles thereto, and this causes the negative plate 24 to move in the same direction without rotation. The single lines screen 26 is fixed in the plate holder 29, so that this movement of the negative plate 24 translates said plate relative to said screen the required distance.

After the negative plate 24 is exposed to the image 14a of the second copy 30 through the single lines screen 26 in the relative positions of said plate and said screen shown in Figure 6, this plate is developed in the ordinary way well-known in the photographic art, to produce a negative having the two images 12a and 14a of the two copies 19 and 30 fixed thereon, each of said images on the developed negative being dissected into a series of parallel transparent lines corresponding to the dark or shadowed part of the original image on the copy. If and where the two images overlap, the lines of one image alternate with the lines of the other image.

A photographic print of the negative is then made onto a piece of metal, preferably zinc and a line printing plate formed therefrom by the photographic-chemical process well-known in the photo-engraving art. The resultant metal line plate will have raised printing lines corresponding to the transparent image lines of the developed negative. This metal line plate will print the picture sheet 11 shown in Figs. 3, 10 and 11 with its two lineiform images or pictures 12 and 14 by ordinary letterpress printing methods for use in connection with the lenticular viewing screen 10, as already described. The width of each image line 13 or 15 in the print sheet 11 will be equal to half the width of each lens element 17 in the lenticular viewing screen 10. Where the lines 13 and 15 of the two images or pictures 12 and 14 come together or overlap, each pair of successive lines 13 and 15 of the two images 12 and 14 will lie behind a lens element 17 of the viewing screen 10, as shown in Fig. 11. The picture sheet 11 and the lenticular viewing screen 10 must be so optically related, that when the combined picture sheet and viewing screen are in one angular position with respect to the line of vision, all of the lines of one image on said picture sheet are within optical range and in focus, while all the lines of the other image are out of focus and out of optical range and when the combined picture sheet and viewing screen are tilted in an opposite direction with respect to the line of vision, the lines of the image previously out of optical range come within optical range and into focus and the image previously viewed flips out of optical range and therefore out of view.

In view of the fineness of the lineations 13 and 15 in the print sheet 11 and the corresponding fineness of the lens elements 17 of the viewing screen 10, very small inaccuracies in the relative position of the print sheet and the viewing screen from exact optical registry, will make material changes in the viewing distance and will cause blurring overlap in the two images as the display device is tilted for picture changeovers. Such inaccuracies may result from temperature changes or from improper assembly. Figure 9 shows a method of assembly which maintains the print sheet 11 and viewing screen 10 under effective control until permanently assembled. The apparatus for adhesively combining the print sheet 11 and the viewing screen 10 comprises a pair of superposed pressure rollers 60 and 61 made of suitable resilient material such as rubber and driven at the same peripheral speed in opposite directions. To prevent adhesive expressed from between the print sheet 11 and viewing screen 10, as they are fed through the bite of the rollers 60 and 61 from overflowing onto the periphery of said rollers, there is provided a spool of absorbent tape 62 trained around the lower pressure roller 60 in feed direction and passing over an apron 63 on the discharge side of said pressure rollers to a discharge station 64, and a spool of absorbent paper tape 65 trained around the upper pressure rollers 61 in feed direction and passing over an apron 66 on the discharge side of said pressure rollers. The paper tapes 62 and 65 are fed by the friction hold of the pressure rollers 60 and 61 thereon at a lineal speed corresponding to the peripheral speed of said rollers, the section of the upper tape 65 projecting beyond the edge of the apron 66 being torn off by the operator at the end of each assembly operation.

On the inlet side of the pressure rollers 60 and 61 is a table 70 for the viewing screen 10 extending to the bite of said rollers and having therealong a guide 71 for the viewing screens. Above the table 70 on the inlet side of the pressure rollers 60 and 61 is a second table 72 for the print sheet 11 slanting downwardly towards the bite of said pressure rollers and having a guide 73 extending therealong for the print sheets. On the discharge side of the pressure rollers 60 and 61 is a table 74 for the assembled pack 10, 11.

The adhesive is applied before assembly to the inner smooth face of each viewing screen 10 in the form of a linear bead A across the viewing screen, so that it will extend transverse to the direction of feed of the screen towards the pressure rollers 60 and 61. This adhesive may, for example, be applied from a can having a long fine dispensing spout or from a collapsible tube and should be clear and transparent, inert to the printing ink on the print sheet 11, so that it does not dissolve or smudge the pictures on said print sheet and of medium viscosity, so that it will be fluid and will spread easily into a thin uniform layer, as the related viewing screen 10 and print sheet 11 are fed together through the bite of the pressure rollers 60 and 61. Also, the adhesive should be such that it does not set immediately upon exposure, but sets after a short period, for example half a minute after it is applied, to permit the assembled viewing screen 10 and the print sheet 11 to be manually adjusted finally in exact optical registry in accordance with the required viewing distance, after the assembled pack has been discharged from the pressure rollers 60 and 61. A suitable cement or adhesive for that purpose consists essentially of nitrocellulose.

In the operation of assembly, the adhesive is applied across the smooth face of the viewing screen 10 and near its forward end as a linear bead A, and the screen is placed with its lenticular face downward upon the table 70 and with one side against the guide 71. Also, the print sheet 11 is placed on the table 72 with its printed or picture face downward and with one side against the guide 73. The two guides 71 and 73 are relatively located to place the superposed viewing screen 10 and print sheet 11 in approximate longitudinal alignment with their respective lineations approximately parallel. The upper print sheet 11 is advanced ahead of the lower viewing screen 10 until said sheet reaches the bite of the pressure rollers 60 and 61, and the sheet and screen then pushed manually together through the bite of said pressure rollers. As the related print sheet 11 and viewing screen 10 converge towards the bite of the pressure rollers 60 and 61, the bead of adhesive A is squeezed uniformly and thinly over the confronting faces of said sheet and screen and any excess extruded from the edges is absorbed by the protective paper tapes 62 and 65.

If desired, instead of one bead of adhesive for each assembly pack, any number of such beads spaced along the viewing screen 10 or the print sheet 11 may be applied, according to the size of these pack elements.

The viewing screen 10 and print sheet 11 are discharged from the pressure rollers 60 and 61 onto the table 74 as an assembled pack. However, the viewing screen 10 and print sheet 11 are not in exact optical registry. While the adhesive is still fluid, the operator immediately upon discharge of the pack 10, 11 onto the table 74, shifts the viewing screen 10 with respect to the print sheet 11, while observing them from the required viewing distance, until one of the pictures 12 or 14 on the print sheet is clearly visible through the viewing screen, while the other picture is out of view. The operator from experience can very quickly in the matter of a few seconds make this final exact adjustment before the adhesive has set. In the finally adjusted position of the viewing screen 10 described, this screen will be in exact optical registry with the image lineations on the print sheet 11, and the pictures viewed through said screen will change quickly and cleanly upon changes in the position of the assembled pack 10, 11 with respect to the line of vision.

In cases where the viewing screen 10 or print sheet 11 have changed their dimensions due for example to changes in temperatures, so that the proper relationship between the lineations of said screen and said print sheet is destroyed, this relationship can be restored before assembly by subjecting either the viewing screen or the print sheet to the required corrective temperature. Once the viewing screen 10 and print sheet 11 have been assembled in proper optical registry and adhesively secured together in this relationship as described, they will maintain this registry in spite of any temperature changes or any other conditions tending to change the dimensions of one element of the assembly with respect to the other.

The assembly operation illustrated in Fig. 9 is applicable to the assembly of a viewing screen and any sheet of the type employed in changeable picture display device and bearing at least two pictures, each picture comprising a series of picture segments arranged along transversely spaced linear rows.

While the invention has been described with particular reference to a specific embodiment, it is to be understood that it is not to be limited thereto but is to be construed broadly and restricted solely by the scope of the appended claim.

What is claimed is:

A process of assembling in succession a series of lenticular viewing screen members and a corresponding series of picture sheet members to form a series of changeable picture display packs, each picture sheet member bearing thereon at least two pictures, each picture comprising a series of picture segments arranged along transversely spaced linear rows, each pack comprising one of said screen members and one of said picture sheet members in face to face contact, said process comprising feeding said screen members and said picture sheet members in succession towards the bite of a pair of cooperating pressure rollers with one series above the other, and with the lower series substantially horizontal as said lower series approaches said rollers and the upper series slanting forwardly towards said lower series as said lower series approaches said rollers, said members being fed towards said rollers in such relationship, that an upper member and a lower member are opposite each other as they pass through the bite of the rollers, applying a bead of transparent adhesive to the upper face of each member of the lower series only across the direction of feed in advance of said bite, passing the members through the bite of said rollers, whereby as a pair of opposed upper and lower members pass through the bite of said rollers, the adhesive bead therebetween is spread over the confronting faces thereof and said upper and lower members are assembled into a pack, and before the adhesive has set on the members of each pack, manually adjusting by visual observation the members of the pack into optical registry.

References Cited in the file of this patent

UNITED STATES PATENTS

| Number | Name | Date |
|---|---|---|
| 761,679 | Ives | June 7, 1904 |
| 1,641,403 | Van Derhoef | Sept. 6, 1927 |
| 1,784,797 | Weinheim | Dec. 9, 1930 |
| 1,949,420 | Johnson | Mar. 6, 1934 |
| 1,955,872 | Cosgrove | Apr. 24, 1934 |
| 2,177,417 | Eggert et al. | Oct. 24, 1939 |
| 2,282,177 | Dike et al. | May 5, 1942 |
| 2,316,202 | Warner | Apr. 13, 1943 |
| 2,343,775 | Land | Mar. 7, 1944 |
| 2,506,131 | Bonnet | May 2, 1950 |
| 2,567,633 | Bonnet | Sept. 11, 1951 |
| 2,591,665 | Ayres | Apr. 8, 1952 |
| 2,603,565 | Land | July 15, 1952 |
| 2,647,056 | Land | July 28, 1953 |
| 2,652,326 | Ogle | Sept. 15, 1953 |